United States Patent
Yamakawa

(10) Patent No.: US 10,435,332 B2
(45) Date of Patent: Oct. 8, 2019

(54) METHOD FOR PREPARING HYDRAULIC COMPOSITION

(71) Applicant: SHIN-ETSU CHEMICAL CO., LTD., Tokyo (JP)

(72) Inventor: Tsutomu Yamakawa, Joetsu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 15 days.

(21) Appl. No.: 15/618,338

(22) Filed: Jun. 9, 2017

(65) Prior Publication Data

US 2017/0355646 A1 Dec. 14, 2017

(30) Foreign Application Priority Data

Jun. 10, 2016 (JP) .................. 2016-116139

(51) Int. Cl.
| | |
|---|---|
| *C04B 40/00* | (2006.01) |
| *C04B 18/02* | (2006.01) |
| *C04B 24/04* | (2006.01) |
| *C04B 24/10* | (2006.01) |
| *C04B 24/38* | (2006.01) |
| *C04B 28/04* | (2006.01) |
| *C04B 103/22* | (2006.01) |
| *C04B 103/30* | (2006.01) |

(52) U.S. Cl.
CPC .......... *C04B 40/0039* (2013.01); *C04B 18/02* (2013.01); *C04B 24/04* (2013.01); *C04B 24/10* (2013.01); *C04B 24/386* (2013.01); *C04B 28/04* (2013.01); *C04B 2103/22* (2013.01); *C04B 2103/302* (2013.01)

(58) Field of Classification Search
CPC ..... C04B 40/0039; C04B 18/02; C04B 24/04; C04B 24/10; C04B 24/386; C04B 28/04; C04B 2103/22; C04B 2103/302
See application file for complete search history.

(56) References Cited

U.S. PATENT DOCUMENTS

| | | | |
|---|---|---|---|
| 5,352,290 A * | 10/1994 | Takeshita | ............... C04B 24/16 106/724 |
| 5,843,216 A * | 12/1998 | Dåstøl | .................. C04B 18/146 106/819 |
| 6,224,250 B1 * | 5/2001 | Kreinheder | ............... B28C 7/02 360/16 |

FOREIGN PATENT DOCUMENTS

| | | |
|---|---|---|
| EP | 1426349 A1 | 6/2004 |
| JP | 55-75955 A | 6/1980 |
| WO | WO 2015/148946 A1 | 10/2015 |

OTHER PUBLICATIONS

Extended European Search Report for European Application No. 17174751.2, dated Nov. 2, 2017.
"Addition of Anti-Washout Underwater Concrete USCA Clean at Job Site", by Cellulose Department, Organic Chemicals Division, Shin-Etsu Chemical Co., Ltd., Jul. 2012, 13 Pages.
Japanese Notice of Reasons for Refusal (including an English translation thereof) issued in the corresponding Japanese Patent Application No. 2016-116139 dated Apr. 9, 2019.

* cited by examiner

*Primary Examiner* — Anthony J Green
(74) *Attorney, Agent, or Firm* — Birch, Stewart, Kolasch & Birch, LLP

(57) ABSTRACT

A hydraulic composition is prepared by mixing (A) an admixture aqueous solution containing a water-soluble salt which is a water-reducing agent or setting retarder, and a water-soluble cellulose ether with (B) a fresh concrete composition containing a hydraulic substance, an aggregate, and water at job site. The method is effective for preventing the admixture solution from thickening even though the water-soluble cellulose ether without glyoxal treatment is used.

5 Claims, No Drawings

_US 10,435,332 B2_

METHOD FOR PREPARING HYDRAULIC COMPOSITION

CROSS-REFERENCE TO RELATED APPLICATION

This non-provisional application claims priority under 35 U.S.C. § 119(a) on Patent Application No. 2016-116139 filed in Japan on Jun. 10, 2016, the entire contents of which are hereby incorporated by reference.

TECHNICAL FIELD

This invention relates to a method for preparing a hydraulic composition.

BACKGROUND ART

Water-soluble cellulose ethers, typically hydroxypropyl methyl cellulose (HPMC), which belong to a class of water-soluble polymers have thickening effects even in hydraulic compositions. They are widely used in concrete applications including anti-washout underwater concrete (for inhibiting segregation during underwater placement), spraying concrete (for preventing dust generation during spraying), and self-consolidating concrete (for inhibiting segregation during placement).

Hydraulic compositions are mixtures of a hydraulic substance such as cement, aggregates such as fine and coarse aggregates, water, a water-reducing agent, and other admixtures. They are generally prepared in a fresh concrete plant. When a hydraulic composition containing a thickener such as a water-soluble cellulose ether as mentioned above is prepared in a ready-mixed concrete plant, the premixed thickener can have detrimental effects to the batch, typically a loss of slump value and an increase of air content. Thus a fresh concrete composition is previously prepared by mixing a hydraulic substance, aggregate, water, water-reducing agent, and other ingredients (excluding thickener) in a fresh concrete plant, and a thickener is added thereto at job site.

However, a problem arises when a powdery thickener is added to a fresh concrete composition. Since the amount of thickener added is very small, it is difficult to add the desired amount of thickener due to powder scattering. The resulting composition fails to exert satisfactory hydraulic effects. For this reason, the thickener is generally added in aqueous solution form. Regrettably, the thickener aqueous solution has a high viscosity, which inhibits addition in high concentration.

To overcome these drawbacks, for example, a water-soluble cellulose ether which has been treated with glyoxal for crosslinking reaction into a temporary water-insolubilized state is added to a fresh concrete composition at job site (see Non-Patent Document 1). With this approach, water-soluble cellulose ethers not having thickened can be added to fresh concrete compositions at sites of placement.

CITATION LIST

Non-Patent Document 1: Addition of Anti-Washout Underwater Concrete USCA Clean at Job Site, by Cellulose Department, Organic Chemicals Division, Shin-Etsu Chemical Co., Ltd., July 2012

SUMMARY OF INVENTION

The method of Non-Patent Document 1 is difficult to add a high-concentration cellulose ether aqueous solution for the reason that the cellulose ether aqueous solution builds up its viscosity outstandingly and becomes awkward to handle as the concentration of water-soluble cellulose ether increases beyond 12% by weight. Therefore, a large volume of water must be furnished at job site and a large volume of a water-soluble cellulose ether aqueous solution must be added to an agitator vehicle. As a matter of course, the glyoxal treatment adds to the cost. It is thus desirable to have a new method that is a replacement for the glyoxal-treated water-soluble cellulose ether.

An object of the invention is to provide a method for preparing a hydraulic composition which method is effective for preventing an admixture aqueous solution from thickening even though a water-soluble cellulose ether without glyoxal treatment is used, the hydraulic composition being easy to handle and exhibiting the desired properties at job site even though a small volume of water is added.

The inventor has found that when an admixture aqueous solution containing a water-soluble salt in the form of a preselected anionic substance and a water-soluble cellulose ether is mixed with a fresh concrete composition at job site, there is prepared a hydraulic composition which is easy to handle and exhibits the desired properties despite addition of a small volume of water.

According to the invention, there is provided a method for preparing a hydraulic composition, comprising the step of mixing (A) an admixture aqueous solution containing a water-soluble salt in the form of an anionic substance selected from water-reducing agents and setting retarders, and a water-soluble cellulose ether with (B) a fresh concrete composition containing a hydraulic substance, an aggregate, and water at job site.

Typically, the admixture aqueous solution (A) has a sodium ion concentration of 1,000 to 50,000 ppm.

Preferably the water-reducing agent is a polycarboxylate-based water-reducing agent, and the setting retarder is sodium gluconate.

Also preferably the water-soluble cellulose ether is at least one cellulose ether selected from among alkyl celluloses, hydroxyalkyl celluloses, and hydroxyalkyl alkyl celluloses.

Advantageous Effects of Invention

The invention enables to prepare a hydraulic composition which is easy to handle and has a low bleeding rate even though a small volume of water is added at job site.

DESCRIPTION OF PREFERRED EMBODIMENTS

The method for preparing a hydraulic composition according to the invention is defined as comprising the step of mixing (A) an admixture aqueous solution containing a water-soluble salt in the form of an anionic substance selected from water-reducing agents and setting retarders, and a water-soluble cellulose ether with (B) a fresh concrete composition containing a hydraulic substance, an aggregate, and water at job site.

(A) Admixture Aqueous Solution

According to the invention, there is furnished an admixture aqueous solution containing a water-soluble salt in the form of an anionic substance selected from water-reducing agents and setting retarders, and a water-soluble cellulose ether. Using the admixture aqueous solution, a hydraulic composition which is easy to handle and exhibits the desired properties when a small volume of water is added may be prepared.

The hydraulic composition using such admixture aqueous solution allows the water-soluble cellulose ether to be added in a high concentration at job site as compared with the use of glyoxal-treated water-soluble cellulose ether. Since the water-soluble cellulose ether is added in a necessary amount to form a hydraulic composition having the desired properties, the resulting hydraulic composition is improved in bleeding and other properties.

While the water-reducing agent is effective for reducing water by controlling agglomeration of the hydraulic composition in water, it may be selected from among polycarboxylate, melamine, and lignin-based water-reducing agents. Suitable polycarboxylate-based water-reducing agents are salts of polycarboxylate copolymers. Examples of the polycarboxylate copolymer include copolymers of an unsaturated mono- or di-carboxylic acid selected from acrylic acid, methacrylic acid, crotonic acid, maleic acid, fumaric acid, itaconic acid and citraconic acid with an unsaturated monomer selected from polyalkylene glycol mono(meth)acrylates, styrene, and unsaturated alcohol compounds having 1 to 100 moles of alkylene oxide added thereto. Suitable melamine-based water-reducing agents include salts of melamine sulfonic acid formaldehyde condensates, salts of melamine sulfonate condensates, and salts of melamine sulfonate polyol condensates. Exemplary of the lignin-based water-reducing agent are lignin sulfonates. The salts of the above compounds are preferably sodium salts for solubility. Of these water-reducing agents, polycarboxylate-based water-reducing agents are more preferred for water reducing effect, fluidity, and fluidity retention.

The water-reducing agent is added in the form of an aqueous solution which has a solids concentration of 5 to 50% by weight. The content of the water-reducing agent aqueous solution in the admixture aqueous solution is preferably 50.0 to 99.0% by weight, more preferably 60.0 to 90.0% by weight, and even more preferably 70.0 to 88.0% by weight. Preferably the total amount of the water-reducing agent aqueous solution and the water-soluble cellulose ether to be described below is 100% by weight.

The setting retarder functions to retard the setting time of hydraulic compositions and is used for purposes of preventing generation of cold joints during concrete casting in a large scale. Examples of the setting retarder include oxycarboxylates such as gluconate and glucoheptonate, keto acid salts, silicofluoride salts, phosphates, and borates. Inter alia, oxycarboxylates are preferred for effective set retardation.

Like the water-reducing agent, the setting retarder is added in the form of an aqueous solution which has a solids concentration of 10 to 50% by weight. The setting retarder is preferably added as an aqueous solution having a concentration as high as possible, typically of 20 to 40% by weight.

For example, when a 30% by weight sodium gluconate aqueous solution is used as the setting retarder, the content of the setting retarder in the admixture aqueous solution is preferably 50.0 to 99.0% by weight, more preferably 60.0 to 90.0% by weight, and even more preferably 70.0 to 88.0% by weight.

The water-soluble cellulose ether used herein is nonionic. Suitable water-soluble cellulose ethers are alkyl celluloses such as methyl cellulose and ethyl cellulose, hydroxyalkyl celluloses such as hydroxypropyl cellulose and hydroxyethyl cellulose, and hydroxyalkyl alkyl celluloses such as hydroxypropyl methyl cellulose and hydroxyethyl ethyl cellulose since they are effective for suppressing material segregation of the hydraulic composition, improving durability by bleeding control, and minimizing variation in strength and quality.

More specifically, examples of the alkyl cellulose include methyl celluloses preferably having a DS of 1.0 to 2.2, more preferably 1.2 to 2.0 and ethyl celluloses preferably having a DS of 1.0 to 2.2, more preferably 1.2 to 2.0.

Examples of the hydroxyalkyl cellulose include hydroxyethyl celluloses preferably having a MS of 0.1 to 3.0, more preferably 0.5 to 2.8 and hydroxypropyl celluloses preferably having a MS of 0.05 to 3.3, more preferably 0.1 to 3.0.

Examples of the hydroxyalkyl alkyl celluloses include hydroxyethyl methyl celluloses (HEMC) preferably having a DS of 1.0 to 2.2, more preferably 1.2 to 2.0 and a MS of 0.05 to 0.6, more preferably 0.10 to 0.5, hydroxypropyl methyl celluloses (HPMC) preferably having a DS of 1.0 to 2.2, more preferably 1.2 to 2.0 and a MS of 0.05 to 0.6, more preferably 0.10 to 0.5, and hydroxyethyl ethyl cellulose preferably having a DS of 1.0 to 2.2, more preferably 1.2 to 2.0 and a MS of 0.05 to 0.6, more preferably 0.10 to 0.5.

As used herein, DS refers to "degree of substitution" representing the number of alkoxy groups per glucose ring unit on the cellulose, and MS refers to "molar substitution" representing the average moles of hydroxyalkoxy groups added per glucose ring unit on the cellulose. With respect to DS of alkyl and MS of hydroxyalkyl, measurement may be made by the analysis of DS of hypromellose (hydroxypropyl methyl cellulose) prescribed in the Japanese Pharmacopoeia, 16th Edition.

From the standpoint of providing the hydraulic composition with the desired viscosity, a 2% or 1% by weight aqueous solution of the water-soluble cellulose ether should preferably have a viscosity at 20° C. of 100 mPa·s (2% by weight) to 30,000 mPa·s (1% by weight), more preferably 400 mPa·s (2% by weight) to 25,000 mPa·s (1% by weight), and even more preferably 500 mPa·s (2% by weight) to 20,000 mPa·s (1% by weight) as measured by a BH type viscometer at 20 rpm. Notably, the viscosity of the water-soluble cellulose ether is a value measured in a 2% by weight aqueous solution when the viscosity is 50,000 mPa·s or less, and a value measured in a 1% by weight aqueous solution when the viscosity measured in a 2% by weight aqueous solution is more than 50,000 mPa·s.

The content of the water-soluble cellulose ether in the admixture aqueous solution is preferably 0.1 to 40% by weight, more preferably 0.5 to 35% by weight, and even more preferably 1 to 30% by weight.

The admixture aqueous solution has a concentration of sodium ions from the anionic substance which is preferably 1,000 to 50,000 ppm, more preferably 2,000 to 40,000 ppm, and even more preferably 5,000 to 20,000 ppm. If the sodium ion concentration is less than 1,000 ppm, the water-soluble cellulose ether dissolves in the admixture aqueous solution rather than salting out. As a result, the admixture aqueous solution increases its viscosity, failing to provide a hydraulic composition having the desired properties when a smaller volume of water is added. If the sodium ion concentration is more than 50,000 ppm, the hydraulic composition accordingly has a high sodium ion concentration, at which steel reinforcements are liable to rust.

The concentration of sodium ions from the anionic substance in the admixture aqueous solution is measured by diluting the admixture aqueous solution with deionized water to a concentration of 1/10,000 of the initial, passing the dilution through a filter with a pore size of 0.2 μM and analyzing the filtrate by ion chromatography. The measurement may be carried out, for example, by an ion chromatograph DIONEX ICS-1600, using columns CG14 (guard)+ CS14 (main), a suppressor CERS-500 (4 mm), all from Thermo Fisher Scientific Inc., and 10 mM methanesulfonic acid as eluent.

A defoamer may be added to the admixture aqueous solution when the admixture aqueous solution foams or the hydraulic composition has an air content in excess of the predetermined level (for example, 6%). Although the defoamer is not particularly limited, it is preferably selected from among oxyalkylene, silicone, alcohol, mineral oil, fatty acid, and fatty acid ester-based defoamers for ease of control of air content.

Examples of the oxyalkylene-based defoamer include polyoxyalkylenes such as (poly)oxyethylene (poly)oxypropylene adducts; (poly)oxyalkylene alkyl ethers such as diethylene glycol heptyl ether, polyoxyethylene oleyl ether, polyoxypropylene butyl ether, polyoxyethylene polyoxypropylene 2-ethylhexyl ether, and oxyethylene oxypropylene adducts to higher alcohols of at least 8 carbon atoms or secondary alcohols of 12 to 14 carbon atoms; (poly)oxyalkylene (alkyl) aryl ethers such as polyoxypropylene phenyl ether and polyoxyethylene nonyl phenyl ether; acetylene ethers obtained from addition polymerization of alkylene oxides to acetylene alcohols such as 2,4,7,9-tetramethyl-5-decyne-4,7-diol, 2,5-dimethyl-3-hexyne-2,5-diol, and 3-methyl-1-butyn-3-ol; (poly)oxyalkylene fatty acid esters such as diethylene glycol oleate, diethylene glycol laurate, and ethylene glycol distearate; (poly)oxyalkylene sorbitan fatty acid esters such as polyoxyethylene sorbitan monolaurate and polyoxyethylene sorbitan trioleate; (poly)oxyalkylene alkyl (aryl) ether sulfuric acid ester salts such as polyoxypropylene methyl ether sodium sulfate and polyoxyethylene dodecyl phenol ether sodium sulfate; (poly)oxylalkylene alkyl phosphoric acid esters such as (poly)oxyethylene stearyl phosphate; (poly)oxyalkylene alkyl amines such as polyoxyethylene lauryl amine; and polyoxyalkylene amides.

Examples of the silicone-based defoamer include dimethylsilicone oil, silicone paste, silicone emulsions, organic modified polysiloxanes (e.g., polyorganosiloxanes such as dimethylpolysiloxane), and fluorosilicone oil. Examples of the alcohol-based defoamer include octyl alcohol, 2-ethylhexyl alcohol, hexadecyl alcohol, acetylene alcohol, and glycol.

Examples of the mineral oil-based defoamer include kerosine and liquid paraffin.

Examples of the fatty acid-based defoamer include oleic acid, stearic acid, and alkylene oxide adducts thereof.

Examples of the fatty acid ester-based defoamer include glycerol monoricinolate, alkenyl succinate derivatives, sorbitol monolaurate, sorbitol trioleate, and natural wax.

Of these, oxyalkylene, mineral oil and fatty acid ester-based defoamers are preferred for the stable dispersion of the admixture aqueous solution.

The content of the defoamer in the admixture aqueous solution is preferably 0.001 to 16% by weight, more preferably 0.002 to 10% by weight.

(B) Fresh Concrete Composition

The hydraulic composition is obtained by mixing (A) the admixture aqueous solution with (B) a fresh concrete composition containing a hydraulic substance, an aggregate, and water at job site.

To the hydraulic composition, the admixture aqueous solution (A) is preferably added in an amount of 1 to 4 kg, more preferably 1.5 to 3.5 kg, and even more preferably 2 to 3 kg per cubic meters ($m^3$) of the fresh concrete composition (B) from the aspects of a necessary amount of water to impart fluidity to the fresh concrete composition (B) which is prepared in a fresh concrete plant and effective mixing at job site.

Typically, the hydraulic substance is cement, examples of which include ordinary Portland cement, high-early-strength Portland cement, moderate-heat Portland cement, blast-furnace slag cement, silica cement, fly-ash cement, alumina cement, and ultra-high-early-strength Portland cement.

To the hydraulic composition, the hydraulic substance is preferably added in an amount of 100 to 600 kg, more preferably 200 to 500 kg, and even more preferably 220 to 400 kg per $m^3$ of the hydraulic composition for compressive strength and fluidity.

Suitable aggregates include coarse aggregates and sand percentages. Examples of the coarse aggregate include river gravel, pit gravel, land gravel, and crushed stone, and the particle size is preferably up to 40 mm, more preferably up to 25 mm. Examples of the fine sand percentages include river sand, pit sand, land sand, silica sand, and crushed sand, and the particle size is preferably up to 10 mm, more preferably up to 5 mm.

To the hydraulic composition, the aggregate (total of coarse and sand percentages) is preferably added in an amount of 1,200 to 2,000 kg, more preferably 1,500 to 1,900 kg per $m^3$ of the hydraulic composition for compressive strength and fluidity. Also the proportion of sand percentages is preferably 30 to 55% by weight, more preferably 35 to 50% by weight based on the total weight of aggregates.

To the hydraulic composition, water is preferably added in an amount of 120 to 240 kg, more preferably 140 to 200 kg, and even more preferably 150 to 175 kg per $m^3$ of the hydraulic composition.

If necessary, an air entraining (AE) agent may be added to the hydraulic composition for providing the predetermined air content and rendering the concrete durable. Suitable AE agents include anionic surfactants, cationic surfactants, nonionic surfactants, and ampholytic surfactants. Examples of the anionic surfactant include carboxylic acid, sulfate, sulfonic acid, and phosphate type surfactants. Examples of the cationic surfactant include amine salt, primary amine salt, secondary amine salt, tertiary amine salt, and quaternary amine salt type surfactants. Examples of the nonionic surfactant include ester, ester-ether, ether, and alkanolamide type surfactants. Examples of the ampholytic surfactant include amino acid and sulfobetaine type surfactants. Of these AE agents, anionic surfactant-based AE agents are preferred for the hydraulic composition from the aspect of air entrainment. The AE agent is preferably added in an amount of 0.001 to 0.01% by weight based on the hydraulic substance.

Further, the hydraulic composition may optionally contain a drying shrinkage reducing agent and expansive additive in an ordinary amount for purposes of preventing cracking by shrinkage upon setting and drying, and preventing cracking by thermal stresses associated with the heat of hydration of cement. Exemplary drying shrinkage reducing agents include alkylene oxide adducts, polyethers, and polyglycols. Exemplary expansive additives include $3CaO \cdot 3Al_2O_3 \cdot CaSO_4$ and CaO. Preferably the drying shrinkage reducing agent is added in an amount of 0.1 to 10% by weight, and the expansive additive is added in an amount of 0.1 to 10% by weight, based on the hydraulic composition.

EXAMPLE

Examples of the invention are given below by way of illustration and not by way of limitation.

A. Preparation of Admixture Aqueous Solution

Preparation Examples A1 to A5 and Comparative Preparation Examples A1 and A2

An admixture aqueous solution was prepared by combining the water-reducing agent or setting retarder and water-soluble cellulose ether listed below in a ratio as shown in Table 1 and mixing at 5,000 rpm for 1 minute on a homomixer (HM-310 by AS ONE Corp.). It is noted that the comparative admixture aqueous solution contained the maximum possible amount of water-soluble cellulose ether to handle the solution.

Ingredients
(1) Water-Reducing Agent
  Chupol EX 60 (WRA-1) by TAKEMOTO OIL & FAT Co., Ltd., polycarboxylate-based water-reducing agent, solids concentration 12.3 wt %, sodium ion concentration 8,600 ppm
  Tupole EX 60 concentrate (concentrated under reduced pressure to about 1.5 times the original concentration) (WRA-2) by TAKEMOTO OIL & FAT Co., Ltd., polycarboxylate-based water-reducing agent, solids concentration 18.0 wt %, sodium ion concentration 12,500 ppm
(2) Setting Retarder
  Sodium gluconate (G), solids concentration 23.1%, sodium ion concentration 24,800 ppm, 1st class grade
(3) Water-Soluble Cellulose Ether
  Hydroxypropyl methyl cellulose (HPMC-1), DS=1.4, MS=0.2, viscosity of 2 wt % aqueous solution 400 mPa·s at 20° C.
  Hydroxypropyl methyl cellulose (HPMC-2), DS=1.8, MS=0.2, viscosity of 2 wt % aqueous solution 390 mPa·s at 20° C.
  Hydroxyethyl methyl cellulose (HEMC), DS=1.5, MS=0.3, viscosity of 2 wt % aqueous solution 410 mPa·s at 20° C.
  Hydroxypropyl methyl cellulose (HPMC-3), DS=1.4, MS=0.2, viscosity of 2 wt % aqueous solution 430 mPa·s at 20° C., treated with 2 wt % (based on HPMC) of glyoxal

B. Preparation of Fresh Concrete Composition

Preparation Example B1

A fresh concrete composition was prepared by blending a cement, sand percentages, coarse aggregate, AE agent, and water listed below in the mixing ratio shown in Table 2. Specifically, a 60-L forced double-shaft mixer was charged with the amounts in Table 2 of the cement, sand percentages, and coarse aggregate, which were dry mixed for 10 seconds. Water and the AE agent were then added to the mixer and kneaded for 90 seconds, yielding a fresh concrete composition. The unit volume of water from which the volume of water required at a placement site, 3.3 L/m$^3$, had been subtracted was 171.7 L/m$^3$. The amount of the AE agent added was 0.0005 wt % per cement unit weight in Examples 1 to 5; and 0.0005 wt %, 0.0003 wt % and 0.0005 wt % per cement unit weight in Comparative Examples 1, 2 and 3, respectively. In Comparative Examples, the amount of the AE agent was adjusted so as to provide the predetermined air content (4.5±1.5 wt %). The volume of the hydraulic composition mixed was 40 L per batch.

Components
(1) Cement
  Ordinary Portland cement by Taiheiyo Cement Corp. (density: 3.16 g/cm$^3$)
(2) Sand Percentage
  Sand having a maximum particle size of 5 mm from Shimonigorigawa, Myoko-shi, Niigata, Japan, water absorption rate: 2.29%, density in saturated surface-dry condition: 2.57 g/cm$^3$, fineness modulus: 2.81%
(3) Coarse Aggregate
  Crushed stone having a maximum particle size of 25 mm from Shimonigorigawa, Myoko-shi, Niigata, Japan, water absorption: 2.05%, saturated surface-dry density: 2.61 g/cm$^3$, fineness modulus: 6.62%
(4) AE Agent:
  MasterAil® No. 775S, BASF Japan, Ltd., modified alkylcarboxylate compound-based anionic surfactant
(5) Defoamer:
  MasterAir® No. 404, BASF Japan, Ltd., polyalkylene glycol derivative
(6) Water (W)
  Tap water

TABLE 1

|  | Anionic substance | | Water-soluble cellulose ether | |
|---|---|---|---|---|
|  | Type | Sodium ion concentration (ppm) | Content (wt %) | Type | Content (wt %) |
| Admixture aqueous solution 1 | WRA-1 | 8,600 | 85.0 | HPMC-1 | 15.0 |
| Admixture aqueous solution 2 | WRA-1 | 8,600 | 85.0 | HEMC | 15.0 |
| Admixture aqueous solution 3 | WRA-1 | 8,600 | 85.0 | HPMC-2 | 15.0 |
| Admixture aqueous solution 4 | WRA-2 | 12,500 | 80.0 | HPMC-1 | 20.0 |
| Admixture aqueous solution 5 | G | 24,800 | 73.0 | HPMC-1 | 27.0 |
| Comparative admixture aqueous solution 1 | — | — | 98.0 | HPMC-1 | 2.0 |
| Comparative admixture aqueous solution 2 | — | — | 90.0 | HPMC-3 | 10.0 |
| Comparative admixture aqueous solution 3 | G | 24,800 | 100.0 | — | — |

TABLE 2

| Coarse aggregate maximum size [Gmax] (mm) | Water/Cement ratio [W/C] (%) | Sand percentage [s/a] (%) | Unit content (kg/m³) | | | |
|---|---|---|---|---|---|---|
| | | | Water [W] | Cement [C] | Fine aggregate [S] | Coarse aggregate [G] |
| 25 | 50 | 45 | 175 | 350 | 774 | 957 |

C. Preparation of Hydraulic Composition

Examples 1 to 5 and Comparative Examples 1 to 3

Each of the admixture aqueous solutions of Examples A1 to A5 and Comparative Examples A1 and A2, 3.3 L/m³, was added to the fresh concrete composition of Preparation Example B1, which was mixed for 90 seconds to yield a hydraulic composition. In Examples 1 to 5, the content of the defoamer in the admixture aqueous solution was adjusted in accordance with the content of water-soluble cellulose ether, specifically to 0.75 wt % in Examples 1 to 3, 1.0 wt % in Example 4, and 1.35 wt % in Example 5.

The resulting hydraulic compositions were evaluated by the following methods, with the results shown in Table 3.

Evaluation Methods

1. Temperature of as-Mixed Hydraulic Composition

The temperatures of ingredients were adjusted such that the hydraulic composition reached a temperature of 20±3° C. at the end of mixing.

2. Air Content

The test was performed according to JIS A 1128.

3. Slump Test

The test was performed according to JIS A 1101.

4. Bleeding Rate

The test was performed according to JIS A 1123. A lower bleeding rate indicates better segregation resistance.

TABLE 3

| | | Concrete properties | | | | |
|---|---|---|---|---|---|---|
| | Type of aqueous solution | Addition amount (L/m³) | Slump (cm) | Air content (%) | Bleeding rate (%) | Temperature (° C.) |
| Example 1 | Admixture aqueous solution 1 | 3.3 | 18.5 | 4.7 | 1.0 | 20.5 |
| Example 2 | Admixture aqueous solution 2 | 3.3 | 18.0 | 4.3 | 1.1 | 20.3 |
| Example 3 | Admixture aqueous solution 3 | 3.3 | 19.0 | 5.0 | 0.8 | 21.0 |
| Example 4 | Admixture aqueous solution 4 | 3.3 | 20.0 | 4.7 | 0.6 | 21.5 |
| Example 5 | Admixture aqueous solution 5 | 3.3 | 10.0 | 5.0 | 5.1 | 21.7 |
| Comparative Example 1 | Comparative admixture aqueous solution 1 | 3.3 | 16.0 | 3.7 | 4.5 | 22.0 |
| Comparative Example 2 | Comparative admixture aqueous solution 2 | 3.3 | 15.0 | 3.5 | 3.8 | 21.0 |
| Comparative Example 3 | Comparative admixture aqueous solution 3 | 3.3 | 11.5 | 3.7 | 12.8 | 19.5 |

Since the admixture aqueous solutions (A) used in Examples 1 to 5 have high sodium ion concentrations, they can be cellulose ether aqueous solutions of high concentrations by virtue of salting-out. Therefore, the predetermined amount (500 g/m³ or more) of water-soluble cellulose ether can be added at a placement site, obtaining hydraulic compositions having an improved bleeding reduction effect as seen from Table 3.

By contrast, in Comparative Examples 1 and 2, the concentration of water-soluble cellulose ether in the admixture aqueous solutions cannot be increased, and so substantially only 66 g/m³ and 330 g/m³ of water-soluble cellulose ether are added. For this reason, the hydraulic compositions are poor in bleeding reduction.

Example 5 using a setting retarder, sodium gluconate as the anionic substance shows a significant reduction of bleeding rate from Comparative Example 3 using the same setting retarder, but not water-soluble cellulose ether.

Japanese Patent Application No. 2016-116139 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method for preparing a hydraulic composition, comprising the step of mixing (A) an admixture aqueous solution containing a water-soluble salt in the form of an anionic substance selected from water-reducing agents and setting retarders, and a water-soluble cellulose ether with (B) a fresh concrete composition containing a hydraulic substance, an aggregate, and water at job site, wherein the water-soluble cellulose ether is at least one cellulose ether selected from the group consisting of hydroxypropyl methyl cellulose and hydroxyethyl methyl cellulose, and the admixture aqueous solution (A) has a sodium ion concentration of 1,000 to 50,000 ppm in which the water-soluble cellulose ether salts out rather than dissolving.

2. The method of claim 1 wherein the admixture aqueous solution (A) has a sodium ion concentration of 2,000 to 40,000 ppm.

3. The method of claim 1 wherein the water-reducing agent is a polycarboxylate-based water-reducing agent.

4. The method of claim 1 wherein the setting retarder is sodium gluconate.

5. The method of claim 1 wherein the water-soluble cellulose ether is hydroxypropyl methyl cellulose.

* * * * *